(12) United States Patent
Maeng et al.

(10) Patent No.: US 11,385,851 B2
(45) Date of Patent: Jul. 12, 2022

(54) ROBOT

(71) Applicant: LG ELECTRONICS INC., Seoul (KR)

(72) Inventors: Seungwoo Maeng, Seoul (KR); Zhimin Choo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 16/497,560

(22) PCT Filed: Mar. 8, 2019

(86) PCT No.: PCT/KR2019/002716
§ 371 (c)(1),
(2) Date: Sep. 25, 2019

(87) PCT Pub. No.: WO2020/184734
PCT Pub. Date: Sep. 17, 2020

(65) Prior Publication Data
US 2021/0365227 A1    Nov. 25, 2021

(51) Int. Cl.
*G06F 3/14* (2006.01)
*H04N 9/31* (2006.01)
*G06V 20/10* (2022.01)
*G06V 40/16* (2022.01)

(52) U.S. Cl.
CPC ............ *G06F 3/1423* (2013.01); *G06V 20/10* (2022.01); *G06V 40/161* (2022.01); *H04N 9/3141* (2013.01)

(58) Field of Classification Search
CPC .............. G06F 3/1423; G06K 9/00228; G06K 9/00664; H04N 9/3141
See application file for complete search history.

(56) References Cited

U.S. PATENT DOCUMENTS

| | | | |
|---|---|---|---|
| 2012/0320343 A1 | 12/2012 | Papaefstathiou et al. | |
| 2014/0222206 A1* | 8/2014 | Mead | G02B 5/20 700/259 |
| 2016/0029063 A1* | 1/2016 | Hwang | H04N 21/2393 725/115 |

FOREIGN PATENT DOCUMENTS

| | | |
|---|---|---|
| JP | 2017-058475 | 3/2017 |
| KR | 10-2012-0097978 | 9/2012 |
| KR | 10-1243262 | 3/2013 |
| KR | 10-2019-0003121 | 1/2019 |

OTHER PUBLICATIONS

International Search Report dated Dec. 5, 2019 issued in Application No. PCT/KR2019/002716.

* cited by examiner

*Primary Examiner* — Michael E Teitelbaum
(74) *Attorney, Agent, or Firm* — KED & Associates LLP

(57) ABSTRACT

According to an embodiment of the present disclosure, a robot comprises: a case configured to form an external shape; a front cover configured to cover an internal space of the case on a front of the case; a projector arranged in the internal space and configured to project an image or a video to a display region of the front cover; a head display arranged in an opening formed at the front cover, and including a display; and a controller configured to output a visual content via at least one of the projector or the display, wherein the display region surrounds at least a portion around the opening.

11 Claims, 17 Drawing Sheets

ROBOT

CROSS-REFERENCE TO RELATED PATENT APPLICATIONS

This application is a U.S. National Stage Application under 35 U.S.C. § 371 of PCT Application No. PCT/KR2019/002716, filed Mar. 8, 2019, whose entire disclosures are hereby incorporated by reference.

FIELD

The present disclosure relates to a robot, and more particularly, to a robot comprising a projector.

BACKGROUND

Robots have been developed for industrial use in order to take charge of a part of factory automation. Recently, a field in which robots are applied is being more expanded, and thus, robots that can be used in daily life, as well as medical robots and aerospace robots, are also being developed Such robots for daily life provide specific services (for example, shopping, serving, conversation, cleaning, and the like) in response to a user's command. In addition, the robots for daily life include displays to display information, videos or images related to the service.

Sometimes, conventional robots for daily life should always include separate display panels in order to display information, videos and images.

Meanwhile, a size of a display panel included in a robot may grow bigger so as to provide much more information or provide various contents via the display panel. Sometimes, if the size of the display panel grows bigger, the general beauty of the robot may be injured. Hence, a way to provide much more information quantity or various contents without injuring the beauty of the robot is being demanded.

SUMMARY

One technical problem to be solved by the present disclosure is intended to provide a robot which outputs a visual content associated by using a plurality of output means.

The other technical problem to be solved by the present disclosure is intended to provide a robot which can actively adjust a display position of a visual content corresponding to height information and a height change of a user.

According to an embodiment of the present disclosure, a robot comprises: a case configured to form an external shape; a front cover configured to cover an internal space of the case on a front of the case; a projector arranged in the internal space and configured to project an image or a video to a display region of the front cover; a head display arranged in an opening formed at the front cover, and including a display; and a controller configured to output a visual content via at least one of the projector or the display, wherein the display region surrounds at least a portion around the opening.

According to an embodiment, the visual content may include a first portion content outputted via the display; and a second portion content outputted via the projector and associated with the first portion content.

According to an embodiment, the second portion content may be displayed on at least a portion of the region corresponding to a circumference of the opening among the display region.

The robot may further include at least one of: a communication unit connected to at least one of a server or a terminal; a microphone configured to acquire information in the shape of a voice or an audio; or a camera configured to acquire information in the shape of an image, and the controller may acquire the visual content based on information acquired via the communication unit, the microphone, or the camera.

The robot may further include a memory for storing a plurality of visual contents, and the controller may load the visual content corresponding to the acquired information among the plurality of visual contents from the memory.

According to an embodiment, the controller may acquire the visual content corresponding to the acquired information from a server connected via the communication unit.

The controller is configured to recognize a situation based on the acquired information, and acquire the visual content corresponding to the recognized situation, and the first portion content indicates facial expressions or glances related to the situation, and the second portion content includes at least one of a motion, a gesture or an object related to the situation.

According to an embodiment, the controller is configured to acquire height information of the user, if the image acquired via the camera includes the user, and set a display position of the visual content outputted via the projector, based on the acquired height information.

The controller may set the display position of the visual content to a first position in the display region of the visual content, if the acquired height information corresponds to a first height, and set the display position of the visual content to a second position higher than the first position, if the acquired height information corresponds to a second height higher than the first height.

According to an embodiment, the controller may recognize a face of the user included in the acquired image, and acquire the height information based on a position of the recognized face.

According to an embodiment, the controller may sense a height change of the user from an image acquired by using the camera among an output of the visual content, and change a display position of the visual content outputted via the projector based on the sensed height change.

The robot may further include a rotary motor for rotating the head display vertically, and the controller may set a rotation angle of the head display based on the acquired height information, and control the rotary motor based on the set rotation angle.

The controller may reset the rotation angle of the head display based on the sensed height change, and control the rotary motor based on the reset rotation angle.

DETAILED DESCRIPTION OF THE PREFERRED EMBODIMENTS

Hereinafter, detailed embodiments of the present disclosure will be described in detail with reference to the accompanying drawings.

Figure 1:
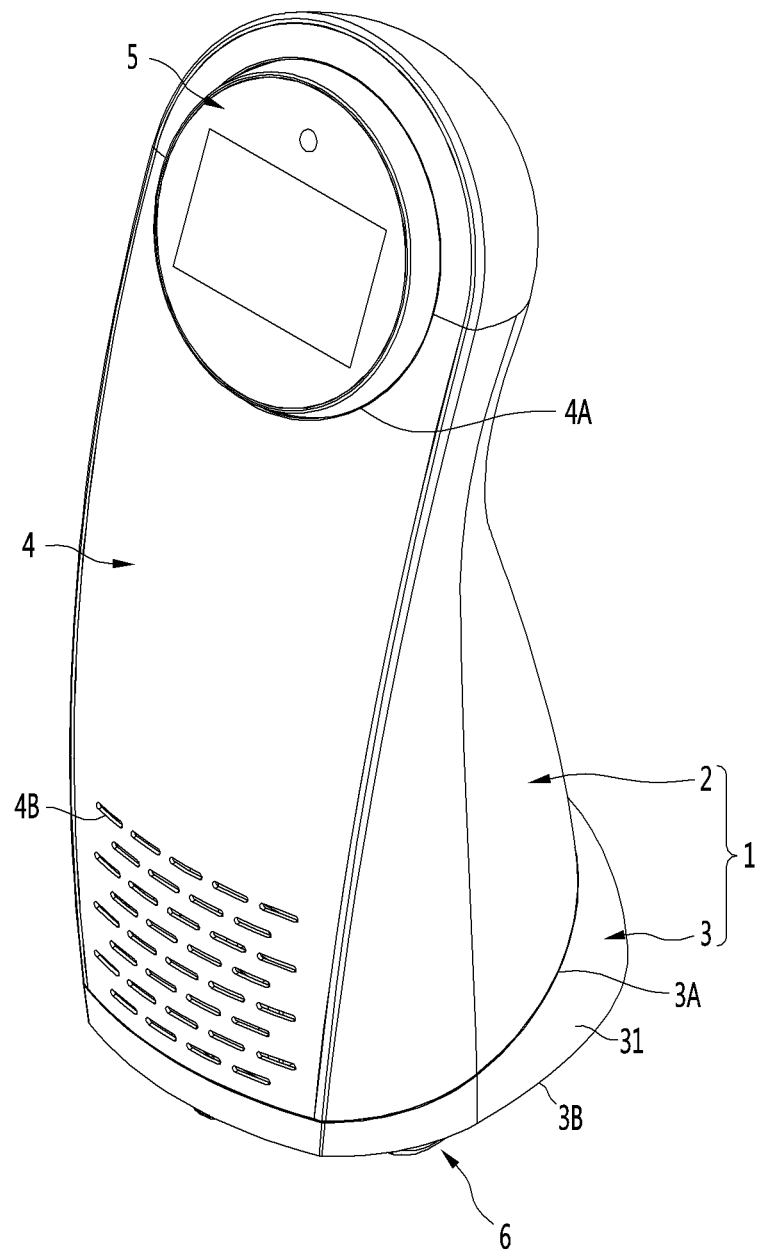
FIG. 1 is a perspective view of a robot according to an embodiment of the present disclosure.
Figure 2:
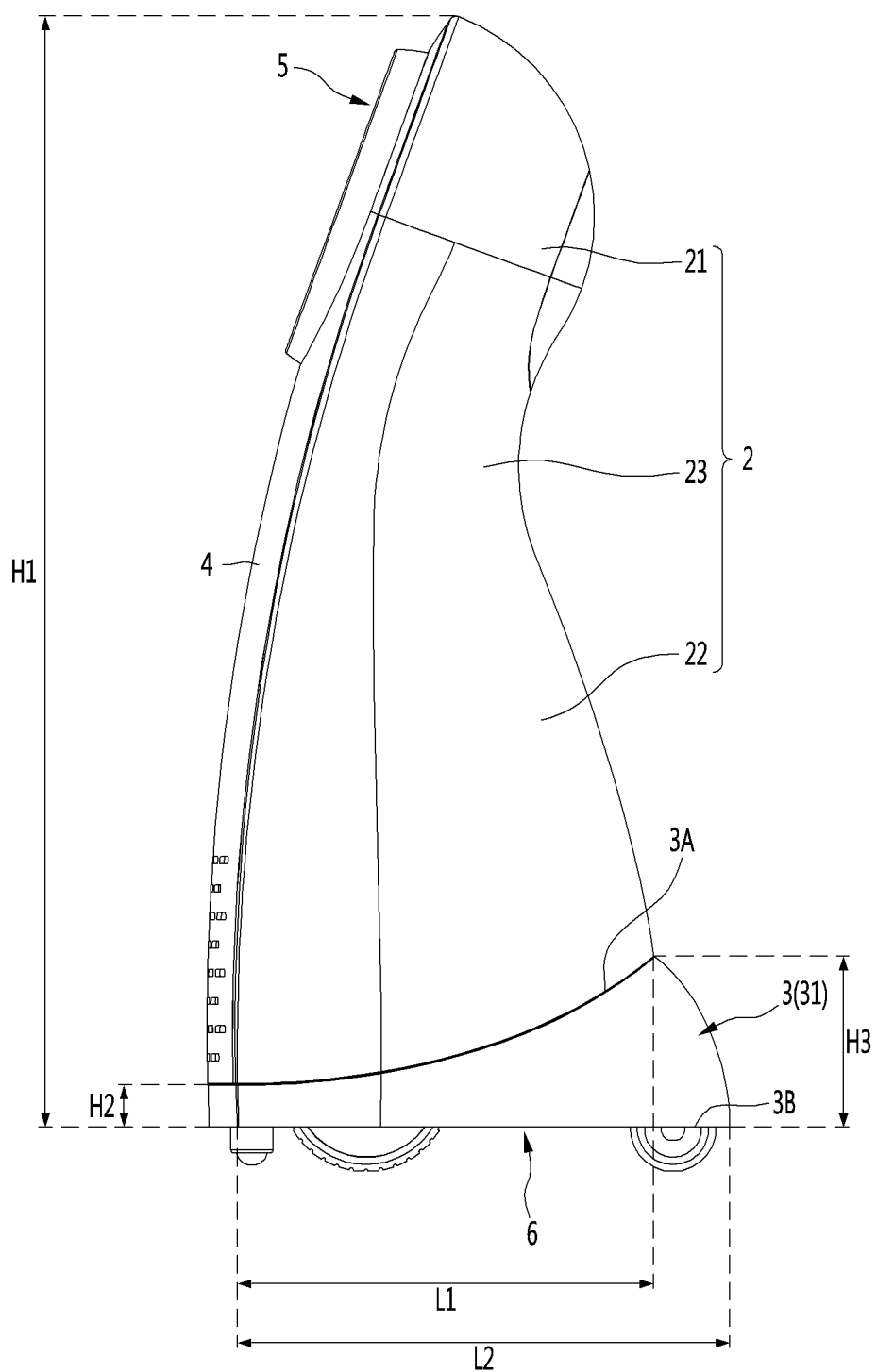
FIG. 2 is a side view of the robot according to an embodiment of the present disclosure.
Figure 3:
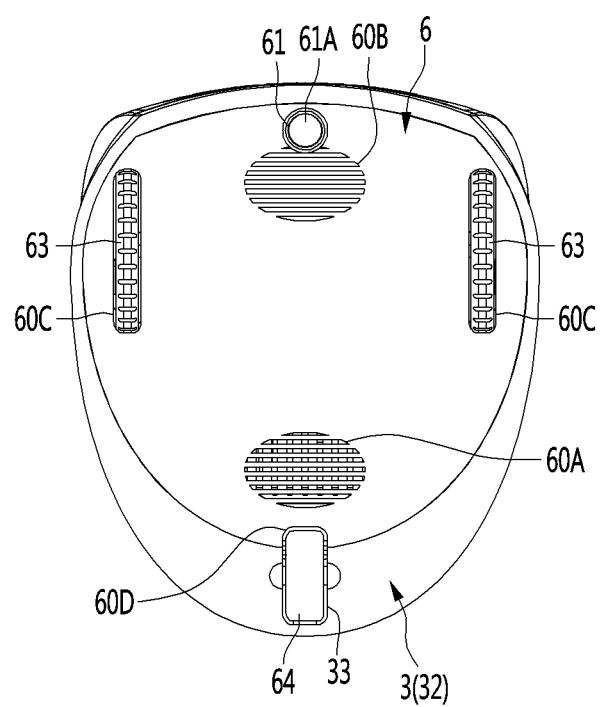
FIG. 3 is a bottom view of the robot according to an embodiment of the present disclosure.

FIG. 1 is a perspective view of a robot according to an embodiment of the present disclosure, FIG. 2 is a side view of the robot according to an embodiment of the present disclosure, and FIG. 3 is a bottom view of the robot according to an embodiment of the present disclosure.

A robot according to an embodiment of the present disclosure may include a case 1, a front cover 4, and a base 6.

The case 1 may form a side and rear external shape of the robot. The case 1 may have a streamlined body having an internal space. The case 1 may be vertically elongated. At least a portion of the front surface of the case 1 may be open.

The front cover 4 can cover the open front surface of the case 1. The front cover 4 can cover the internal space of the case 1 from the front. The front cover 4 can form the front external shape of the robot. The front cover 4 may have a streamlined curved shape. The front cover 4 may be formed to be inclined or bent rearward as it goes forward.

The base 6 can form the lower external shape of the robot. The base 6 may be a plate shape.

The case 1 may be connected with the base 6 over the base 6.

In more detail, the case 1 may include a lower case 3 connected with the base 6 and an upper case 2 connected over the lower case 3.

The upper case 2 may have a streamlined body. The front surface of the upper case 2 may be open and can be covered by the front cover 4.

The upper case 2 may be vertically elongated. The height H1 of the upper case 2 may be larger than the height H3 of the lower case 3.

The upper case 2 may include a head part 21, a body part 22 disposed under the head part 21, and a connection part 23 positioned between the head part 21 and the body part 22.

The head part 21, the body part 22, and the connection part 23 may be integrally formed.

The connection part 23 may be continuously connected with the head part 21 and the body part 22 without being stepped or bending. Accordingly, the upper case 2 can have a streamlined body and the external shape of the robot can be aesthetically formed.

A head display 5 to be described below may be connected to the head part 21. The horizontal size of the head part 21 may gradually increase upward from the connection part 23 and then gradually decrease after passing a predetermined position.

The body part 22 may be positioned under the head part 21 and the connection part 23. The lower end of the body part 22 may be connected with the lower case 3.

The body part 22 may be formed larger than the head part 21. In more detail, the height of the body part 22 may be larger than the height of the head part 21 and the horizontal size of the body part 22 may be larger than the horizontal size of the head part 21.

The horizontal size of the body part 22 may gradually decreases upward.

The connection part 23 may be positioned between the body part 22 and the head part 21. The connection part 23 can connect the body part 22 and the head part 21.

The connection part 23 may be formed smaller than the body part 22 and the head part 21.

The front end edges of the head part 21, the body part 22, and the connection part 23 may be continuously connected without being stepped. Accordingly, the front cover 4 having a curved plate shape can be smoothly connected to the front end edges of the head part 21, the body part 22, and the connection part 23.

The lower case 3 may be connected under the upper case 2.

The lower case 3 may be formed such that the front portion height H2 is smaller than the rear portion height H3. The height H3 of the lower case 3 may mean the rear portion height H3.

The lower case 3 may include a circumferential surface 31 and a bottom surface 32.

The circumferential surface 31 of lower case 3 may form the lower outer circumference of the robot.

The lower end of the rear portion of the lower case 3 may protrude rearward further than the upper end of the rear portion of the lower case 3. That is, the front-rear distance L2 from the front surface to the lower end of the rear portion of the lower case 3 may be larger than the front-rear distance L1 from the front surface to the upper end of the rear portion of the lower case 3. Accordingly, a projector 7 to be described below can be disposed eccentrically rearward in the lower case 3.

The lower case 3 may be formed such that an upper end 3A of the circumferential surface 31 is bent or inclined to be lowered forward. On the contrary, a lower end 3B of the circumferential surface 31 of the lower case 3 may be horizontally formed.

The upper end 3A and the lower end 3B of the circumferential surface 31 each may have a ring shape. The size of the ring formed by the upper end 3A of the circumferential surface 31 may be smaller than the size of the ring formed by the lower end 3B. That is, the circumferential surface 31 of the lower case 3 may horizontally increase as it goes from the upper end 3A to the lower end 3B.

The bottom surface 32 of the lower case 3 may be connected with the base 6. The bottom surface of the lower case 3 may be formed toward the base 6 from the lower end 3B of the circumferential surface 31.

The bottom surface 32 of the lower case 3 may horizontally formed.

The lower surface 32 of the lower case 3 and the lower case of the base 6 may be formed in parallel and continuously connected without being stepped. Accordingly, the base 6 may form a portion of the bottom surface of the robot and the bottom surface 32 of the lower case 3 may form the other portion of the bottom surface of the robot.

However, the present disclosure is not limited thereto, and it may be possible that the lower case 3 does not include the bottom surface 32 and the lower end of the circumferential surface 31 of the lower case 3 may be directly connected to the base 6.

The upper case 2 may be connected to a portion of the upper end 3A of the lower case 3. Accordingly, the lower end of the upper case 2 can be formed to be bent or inclined downward as it goes forward in correspondence to the upper end 3A of the lower case 3.

In this case, the front case 4 may be connected to another portion of the upper end 3A of the lower case 3. Accordingly, the front portion height H2 is larger than the rear portion height H3 of the lower case 3, so the front cover 4 can be vertically elongated with the robot kept compact.

On the other hand, the front cover 4 can form the front surface of the robot. The front cover 4 may have a curved plate shape that is curved rearward as it goes upward.

The front cover 4 may be vertically elongated. The height of the front cover 4 may correspond to the height of the upper case 2.

The upper and both side edges of the front cover 4 may be connected with the front end edge of the upper case 2. The lower edge of the front cover 4 may be connected with the upper end 3A of the lower case 3.

An opening 4A in which the head display 5 is disposed may be formed at the front cover 4. The opening 4A may be formed through a portion of the upper portion of the front cover 4.

The opening 4A may be formed in a size that can avoid interference with the head display 5.

A plurality of sound holes 4B may be formed at the front cover 4. The sound holes 4B may be formed through a portion of the lower portion of the front cover 4. Sound from a speaker 82 (see FIG. 4) to be described below can be discharged through the sound holes 4B.

The base 6 can form at least a portion of the bottom surface of the robot. The base 6 may be a horizontal plate shape.

A plurality of heat dissipation holes 60A and 60B may be formed at the base 6. The heat dissipation holes 60A and 60B may be formed vertically through the base 6.

The heat dissipation holes 60A and 60B can discharge heat generated in the case 2. In more detail, airflow generated by a heat dissipation fan (see FIG. 6) to be described below can pass through the heat dissipation holes 60A and 60B.

The plurality of heat dissipation holes 60A and 60B may include a front heat dissipation hole 60A that is adjacent to the front edge of the base 6 and a rear heat dissipation hole 60b that is adjacent to the rear edge of the base 6.

Wheel through-holes 60C through which driving wheels 63 to be described below pass may be formed at the base 6.

The wheel through-holes 60C may be spaced apart from the heat dissipation holes 60A and 60B and may be formed vertically through the base 6.

A pair of wheel through-holes 60C may be respectively adjacent to both side edges of the base 6.

The base 6 may have a supporting ball 61A that prevents the robot from falling forward. In more detail, a ball mount portion 61 in which the support ball 61A is mounted may be formed at the base 6. The ball mount portion 61 may be a hollow cylindrical shape protruding downward from the bottom surface of the base 6. The ball mount portion 61 may be adjacent to the front edge of the base 6.

An avoiding groove 60D that prevents interference with an assistant wheel 64 may be formed at the base 6. The assistant wheel 64 can prevent the robot from falling backward. The avoiding groove 60D may be formed at the rear edge of the base 6.

In this case, the assistant wheel 64 can be rotatably connected to the lower case 3. In more detail, an assistant wheel mount portion 33 in which the assistant wheel 64 is rotatably mounted by be formed at the rear portion of the lower case 3 and a portion of the front side of the assistant wheel 64 mounted in the assistant wheel mount portion 33 can be inserted in the avoiding groove 60D of the base 6.

On the other hand, the robot according to an embodiment of the present disclosure may include the head display 5.

The head display 5 may be connected to the case 1. In more detail, the head display 5 may be rotatably connected to the head part 21 of the upper case 2.

The head display 5 may face the front. The head display 5 can be rotated about a virtual horizontal axis elongated to the left and right. Accordingly, the head display 5 can rotate to face the front upper side, the horizontal front, or the front lower side.

The head display 5 may be disposed in the opening 4A formed at the front cover 4. Accordingly, the rotating head display 5 may not interfere with the front cover 4.

Images or videos showing the facial expressions of people can be displayed on the head display 5. Accordingly, a user can feel emotional sympathy with the robot.

Figure 4:
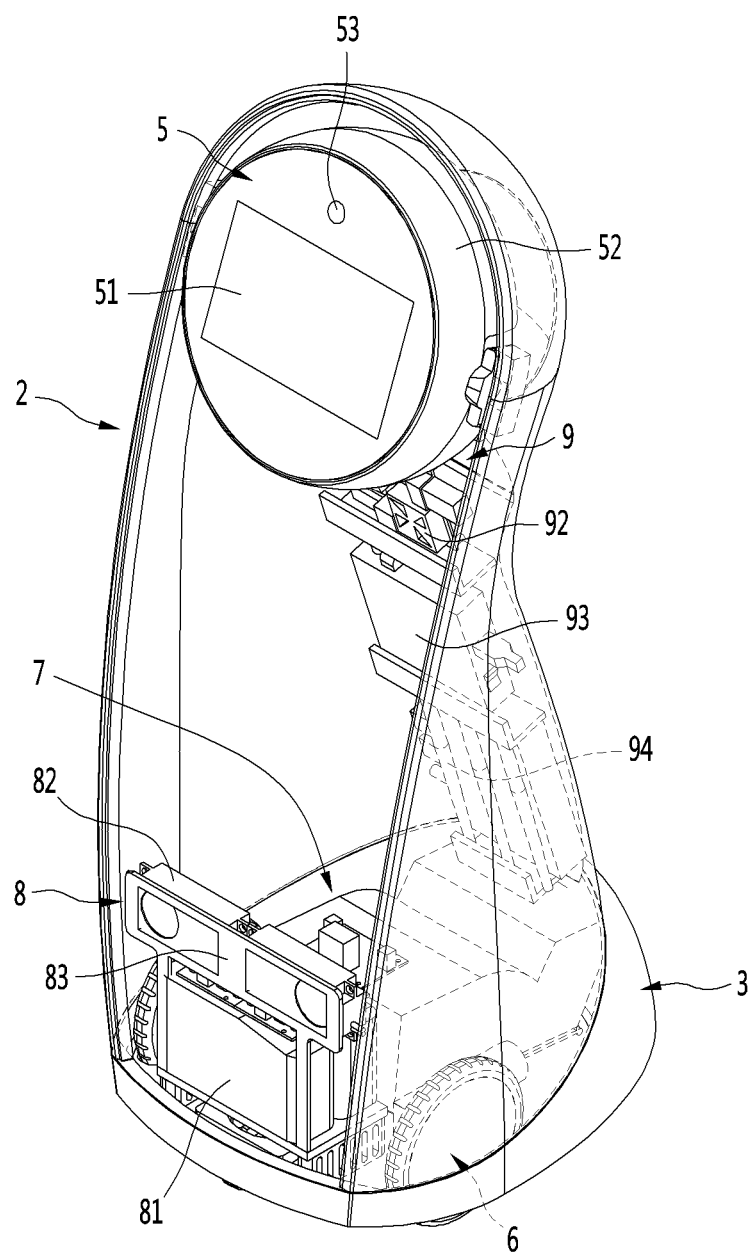
FIG. 4 is a view showing the robot according to an embodiment of the present disclosure with a front cover removed.
Figure 5:
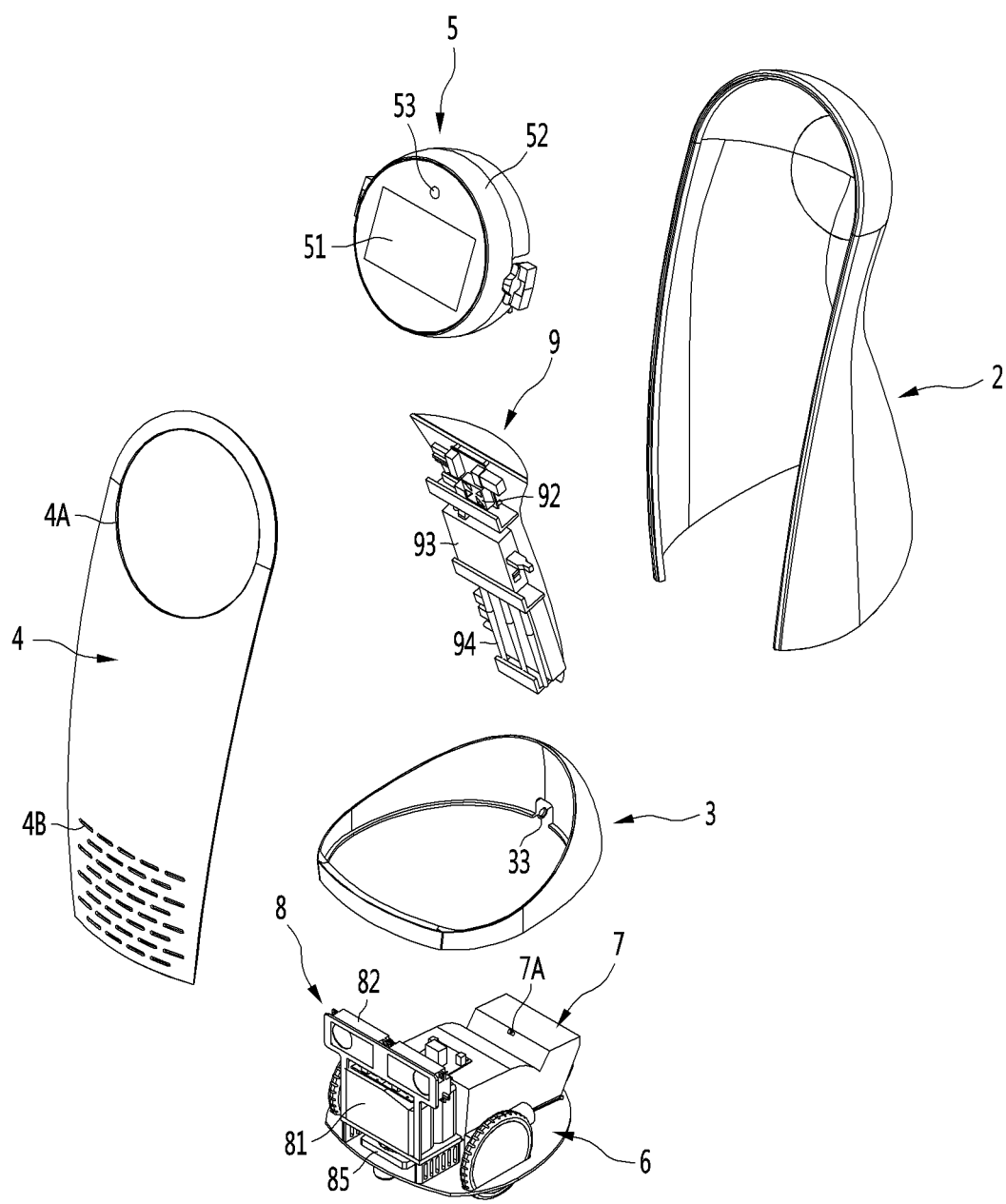
FIG. 5 is an exploded perspective view of the robot according to an embodiment of the present disclosure.

FIG. 4 is a view showing the robot according to an embodiment of the present disclosure with a front cover removed and FIG. 5 is an exploded perspective view of the robot according to an embodiment of the present disclosure.

The head display 5 may include a display 51, a housing 52, and a camera 53.

The display 51 can form at least a portion of the front surface of the head display 5. Videos or images can be displayed on the display 51.

The housing 52 can form the circumferential surface of the head display 5. The housing 52 may have a substantially hollow cylindrical shape.

The camera 53 may face the front. The camera 53 can sense a user, obstacles, etc. positioned ahead of the robot. The camera 53 may be positioned over the display 51.

A camera mounting bracket 53A (see FIG. 9) in which the camera 53 is mounted may be disposed in the housing 52.

Figure 9:
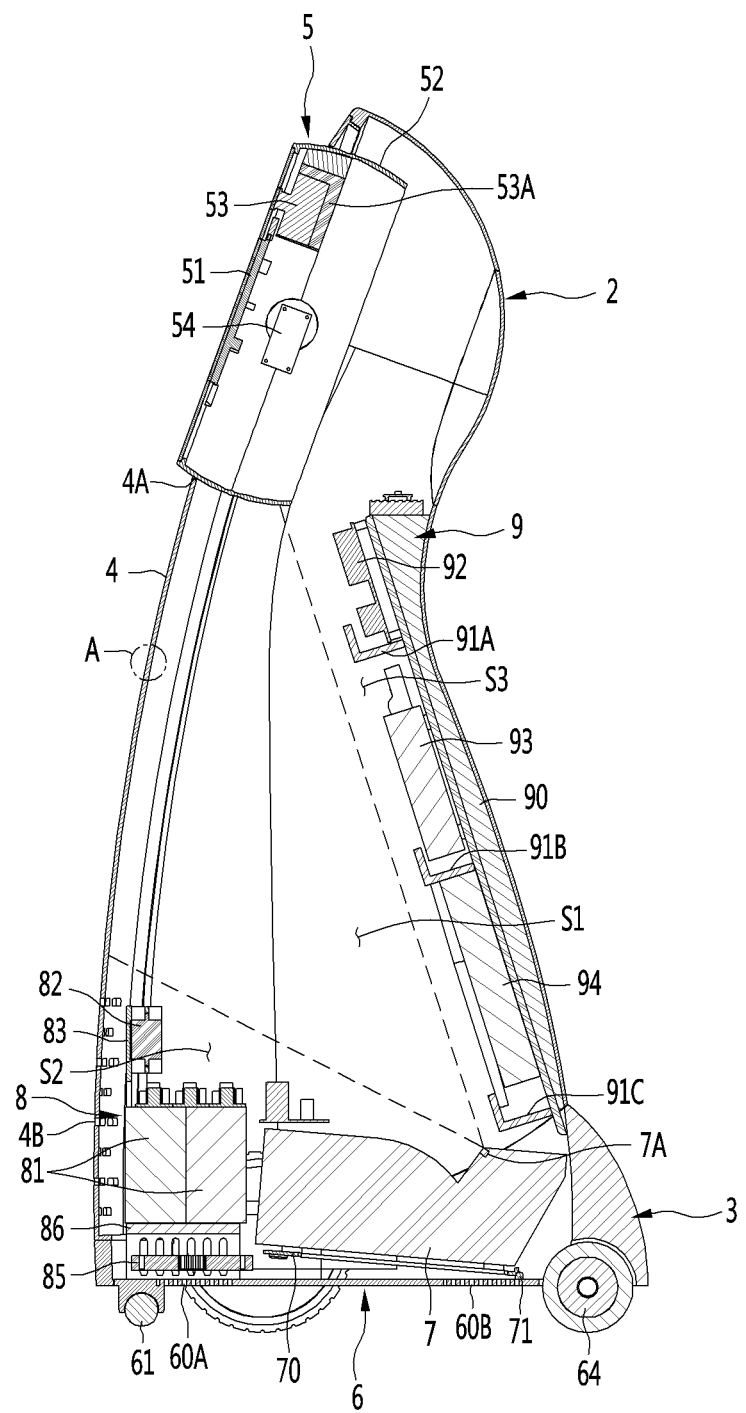
FIG. 9 is a cross-sectional view showing the inside of the robot according to an embodiment of the present disclosure.

The head display 5 can be rotated with respect to the case 1, in more detail, the upper case 2 by a rotary motor 54 (see FIG. 9). The rotary motor 54 may be disposed in the housing 52.

The robot according to an embodiment of the present disclosure may include a projector 7 that projects videos or images to the front cover 4. Accordingly, videos or images can be displayed on the front cover 4 regardless of the head display 5.

The projector 7 may be disposed in the case 1. In more detail, the projector 7 may be disposed in the lower case 3.

The projector 7 may be seated on the base 6. Accordingly, the height of the center of gravity of the robot can be lowered and the danger of falling down of the robot can be reduced by the weight of the projector 7.

The projector 7 may be disposed eccentrically rearward in the case 1. Accordingly, it is possible to secure a sufficient focal distance such that images can be formed on the front cover 4 by light emitted from the projector 7.

The projector 7 may be disposed to face the front upper side. In more detail, a light emission part 7A of the projector 7 may be disposed to face the front upper side. Accordingly, the area where images are formed on the front cover 4 can be widened.

The robot according to an embodiment of the present disclosure may include a built-in component 8 disposed ahead of the projector 7.

The built-in component 8 may be disposed in the case 1. The built-in component 8 may be seated on the base 6.

Since the projector 7 faces the front upper side, a beam emitted from the projector 7 can travel toward the front cover 4 without being blocked by the built-in component 8 positioned ahead of the projector 7.

Accordingly, the beam of the projector 7 can smoothly reach the front cover 4 and the built-in components 8 for the operation of the robot can be efficiently arranged. Accordingly, the robot can be made compact.

The built-in component 8 may include at least one of a battery 81 and a speaker 82.

The battery 81 can supply power for the operation of the robot. The battery 81 is a part having relatively large weight, so it is preferable that the battery 81 lowers the center of gravity of the robot by being seated on the base 6.

The speaker 82 may be disposed over the battery 81. The speaker 82 may face the front and sound generated from the speaker 82 can be discharged out of the robot through sound holes 4B formed at the front cover 4.

The robot according to an embodiment of the present disclosure may include an inner bracket 9 that is positioned over the projector 7 and to which a plurality of electronic components 92, 93, and 94 is fastened.

The inner bracket 9 may be fastened to the inner rear surface of the case 1. In more detail, the inner bracket 9 may be fastened to the inner rear surface of the body part 22 of the upper case 2.

The inner bracket 9 may be disposed at an angle such that the height increases forward.

The inner bracket 9 may be positioned over the projector 7. The inner bracket 9 may vertically overlap the projector 7. Since the projector 7 faces the front upper side, the beam emitted from the projector 7 can travel toward the display region 41 of the front cover 4 without being interfered with by the inner bracket 9.

Accordingly, the beam of the projector 7 can smoothly reach the front cover 4 and the electronic components 92, 93, and 94 for the operation of the robot can be efficiently arranged. Accordingly, the robot can be made compact.

The electronic components 92, 93, and 94 may be mounted on the front surface of the inner bracket 9.

The electronic components 92, 93, and 94 may include at least one of a control board 92, a calculator 93, and a communication module 94.

The control board 92, the calculator 93, and the communication module 94 may be vertically disposed. For example, the control board 92 may be mounted on the upper portion of the inner bracket 9, the calculator 93 may be mounted on the middle portion of the inner bracket 9, and the communication module 94 may be mounted on the lower portion of the inner bracket 9.

The function of each of the control board 92, the calculator 93, and the communication module 94 is well known, so description related to the functions is omitted.

Figure 6:
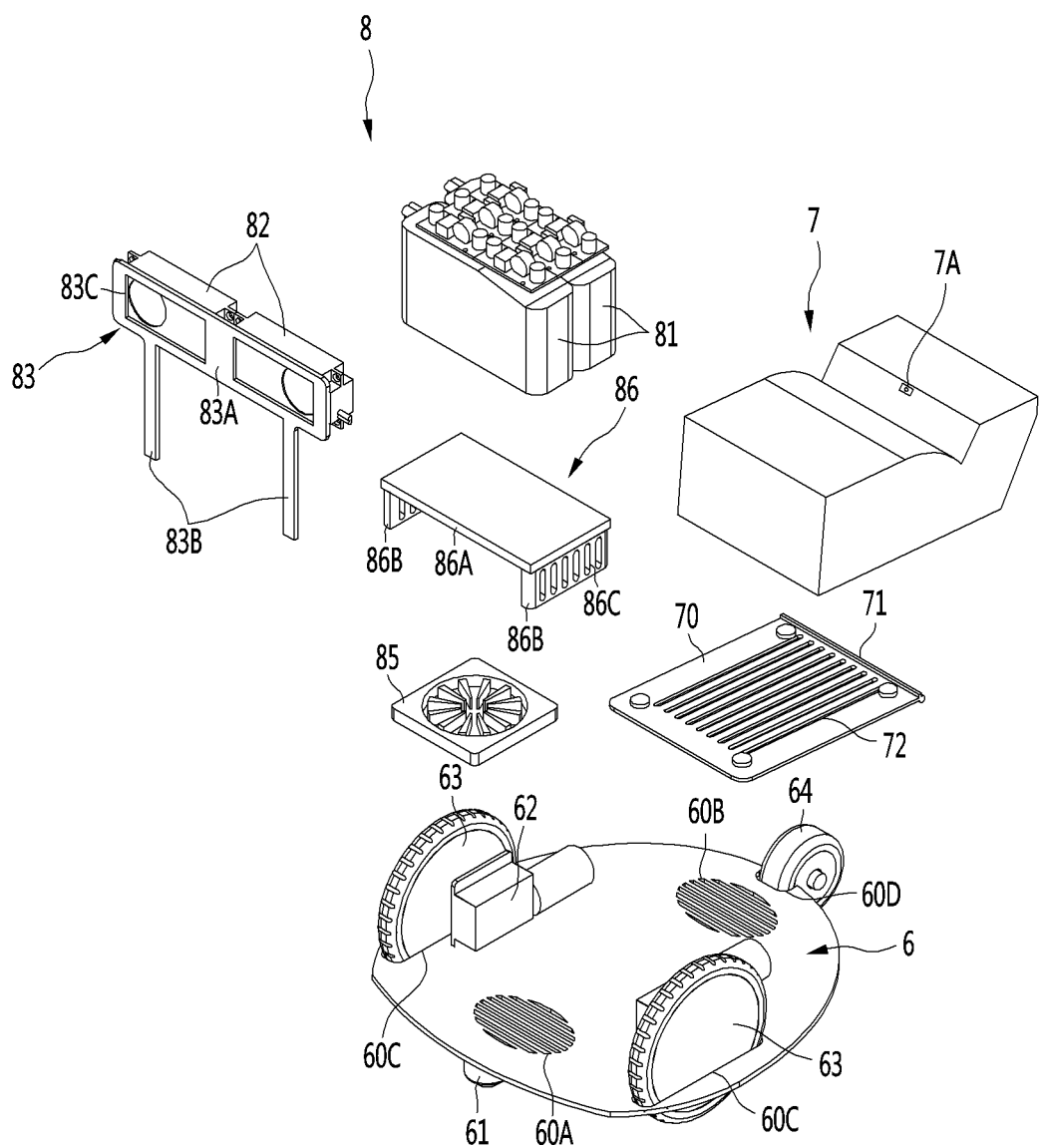
FIG. 6 is a view illustrating a base, and a projector and built-in components seated in the base according to an embodiment of the present disclosure.

FIG. 6 is a view illustrating a base, and a projector and built-in components seated in the base according to an embodiment of the present disclosure.

The robot according to the present disclosure may include driving motors 62 and driving wheels 63 connected to the driving motor 62.

The driving motors 62 and the driving wheels 63 may be disposed at the base 6. The driving motor 62 may be disposed on the top surface of the base 6 and the driving wheels 63 may be disposed in the wheel through-holes 60C formed through the base 6.

The driving motors 62 and the driving wheels 63 each may be provided in pairs. A pair of driving motors 62 may be spaced left and right. A pair of driving wheels 63 may be spaced left and right.

At least a portion of the projector 7 may be positioned between the pair of driving motors 62. Accordingly, the installation position of the projector 7 can be lowered.

The projector 7 may be mounted on a projector seat panel 70 connected to the base 6 to be able to tilt.

The projector seat panel 70 can support the projector 7 from under the projector 7. Since the projector seat panel 70 is connected to the base 6 to be able to tilt, there is an advantage in that the installation angle of the projector 7 can be easily adjusted.

For example, a worker can fasten a supporter (not shown) having a predetermined height to the top surface of the base 6 and then connect the projector seat panel 70 to the base 6. In this case, the front portion of the projector seat panel 70 can be supported by the supporter, and the projector seat panel 70 and the projector 7 can be maintained at a predetermined angle.

In more detail, a tilting shaft 71 elongated left and right may be disposed on the rear edge of the projector seat panel 70. The tilting shaft 71 may be rotatably connected to the top surface of the base 6. In more detail, the tilting shaft 71 may be connected to the top surface of the base 60 between the heat dissipation hole 60B and the avoiding groove 60D.

A plurality of projector heat dissipation holes 72 may be formed at the projector seat panel 70. The projector heat dissipation holes 72 may be oblong holes elongated forward and rearward.

At least some of the projector heat dissipation holes 72 may face a rear heat dissipation hole 60b formed at the base 6. Accordingly, heat generated by the projector 7 can be easily dissipated through the projector heat dissipation holes 72 and the rear heat dissipation hole 60B.

Meanwhile, the robot according to an embodiment of the present disclosure may further include a heat dissipation fan 85 disposed under the built-in component 8.

The heat dissipation fan 85 generates airflow that passes through the front heat dissipation hole 60A and the rear heat dissipation hole 60B, thereby being able to easily dissipate heat generated in the robot. The airflow generated by the heat dissipation fan 85 can be suctioned into any one of the front heat dissipation hole 60A and the rear heat dissipation hole 60B and can be discharged through the other one.

The heat dissipation fan 85 may be positioned over the front heat dissipation hole 60A formed at the base 6. The heat dissipation fan 85 may be horizontally disposed.

The heat dissipation fan 85 may be disposed between a supporting body 86 supporting the built-in component 8 and the base 6.

The heat dissipation fan 85 and the supporting body 86 may be positioned between the pair of driving wheels 63 and/or driving motors 62.

In more detail, the supporting body 86 may include a supporting plate 86A horizontally formed and a supporting wall 86B formed downward from the edge of the supporting plate 86A.

The supporting plate 86A may be spaced apart upward from the base 6. The heat dissipation fan 85 may be positioned between the supporting plate 86A and the base 6.

The supporting wall 86B may be formed a both edges of the supporting plate 86A. The supporting wall 86B may space the supporting plate 86A apart from the base 6. Any one of a pair of supporting walls 86B may be positioned at side of the heat dissipation fan 85 and the other one may be positioned at the other side of the heat dissipation fan 85.

A through-hole 86C may be formed through the supporting wall 86B. The through-hole 86C may be oblong holes vertically elongated. A plurality of through-holes 86C may be formed and the plurality of through-holes 86C may be spaced forward and rearward. The airflow generated by the heat dissipation fan 85 can smoothly dissipate heat of the driving motors 62 by the through-holes formed through the supporting walls 86B.

The built-in component 8 may be supported by the supporting body 86.

In more detail, the battery 81 may be seated on the supporting plate 86A. The speaker 82 may be mounted on a speaker mounting bracket 83 fastened to the supporting body 86 and may be positioned over the battery 81.

The speaker mounting bracket 83 may include a mounting part 83A on which the speaker 82 is mounted and a leg part 83B elongated downward from the mounting portion 83A.

The mounting part 83A may be a panel shape. The mounting part 83A may be mounted on the front surface of the speaker 82.

The mounting part 83A may be elongated left and right. In this case, a plurality of speakers 82 may be disposed left and right and mounted on the mounting part 83A. This is because when a plurality of speakers 82 is vertically disposed, the beam emitted from the projector 7 may be blocked by the speakers 82.

An open hole 83C may be formed in the front-rear direction through the mounting part 83A. A sound discharge part of the speaker 82 may face the open hole 83C.

At least one leg part 83B may be formed. The leg part 83B may be a bar shape vertically elongated, but is not limited thereto.

The lower end of the leg part 83B may be fastened to the supporting body 86. The leg part 83B can space the speaker 82 apart upward from the supporting body 86.

Figure 7:
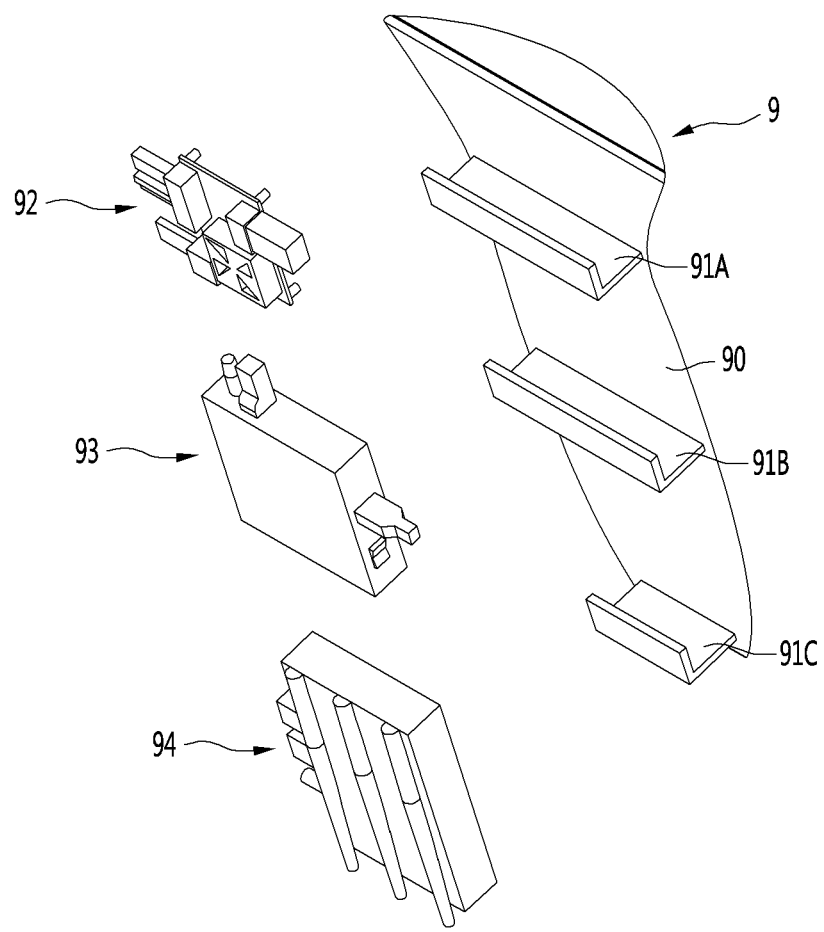
FIG. 7 is a view illustrating an inner bracket and electronic components mounted on the inner bracket according to an embodiment of the present disclosure.

FIG. 7 is a view illustrating an inner bracket and electronic components mounted on the inner bracket according to an embodiment of the present disclosure.

The electronic components 92, 93, and 94 may be mounted on the inner bracket 9. Hereafter, an example in which the control board 92, the calculator 93, and the communication module 94 are mounted on the inner bracket 9 is described.

The inner bracket 9 may include a bracket body 90 and assistant brackets 91A, 91B, and 91C disposed on the front surface of the bracket body 90.

The bracket body 90 may be disposed at an angle such that the height increases forward.

The rear surface of the bracket body 90 may include a curved surface corresponding to the inner rear surface of the upper case 2 and the front surface of the bracket body 90 may include a flat surface. Accordingly, the electronic components 92, 93, and 94 can be easily mounted on the front surface of the bracket body 90.

The assistant brackets 91A, 91B, and 91C may be disposed on the front surface of the bracket body 90. The assistant brackets 91A, 91B, and 91C may be elongated left and right. Each of the assistant brackets 91A, 91B, and 91C may include a first part protruding perpendicular to the front surface of the bracket body 90 and a second part bending upward perpendicular to the first part from the front end of the first part.

The plurality of assistant brackets 91A, 91B, and 91C may be vertically spaced. The plurality of assistant brackets 91A, 91B, and 91C may include a first assistant bracket 91A, a second assistant bracket 91B positioned under the first assistant bracket 91A, and a third assistant bracket 91C positioned under the second assistant bracket 91B.

The control board 92 may be positioned over the first assistant bracket 91A. The calculator 93 may be positioned between the first assistant bracket 91A and the second assistant bracket 91B. The communication module 94 may be positioned between the second assistant bracket 91B and the third assistant bracket 91C.

Figure 8:
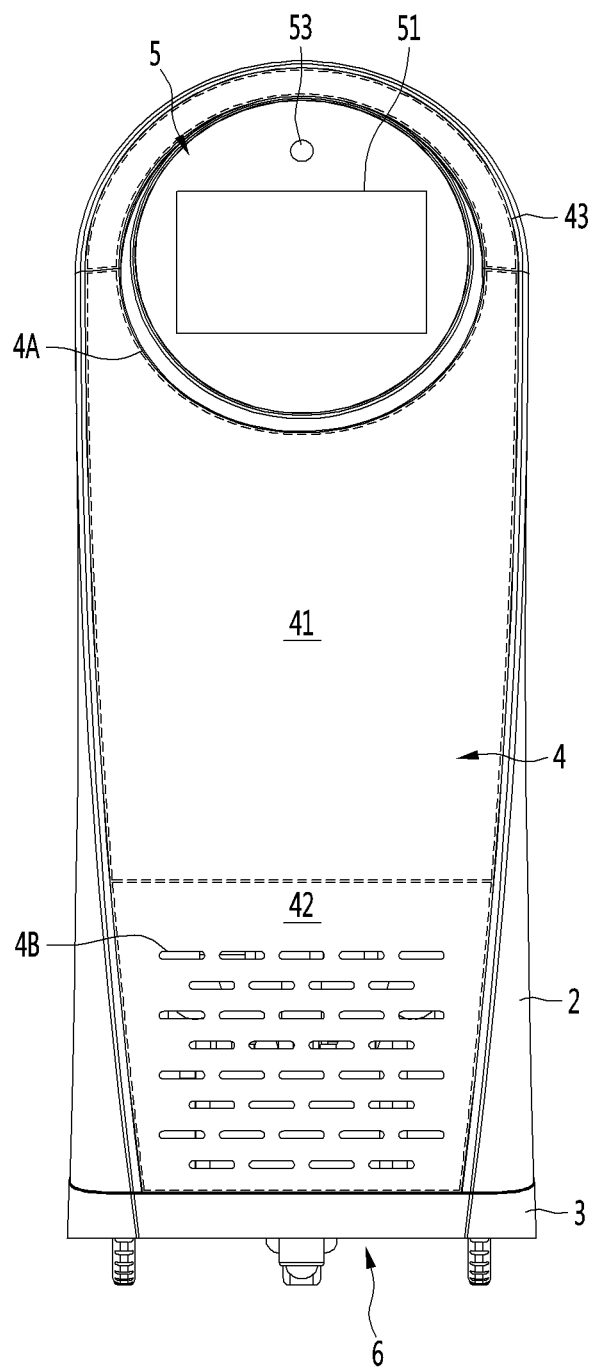
FIG. 8 is a front view showing a display region and a non-display region of a front cover according to an embodiment of the present disclosure.
Figure 10:
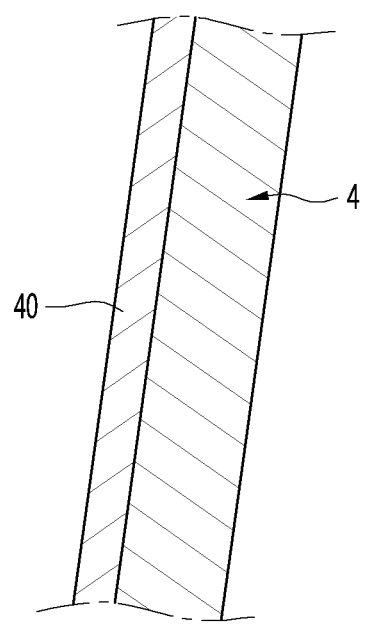
FIG. 10 is a view enlarging the portion A of FIG. 9.

FIG. 8 is a front view showing a display region and a non-display region of a front cover according to an embodiment of the present disclosure, FIG. 9 is a cross-sectional view showing the inside of the robot according to an embodiment of the present disclosure, and FIG. 10 is a view enlarging the portion A of FIG. 9.

The front cover 4 may include a display region 41 in which images or videos projected from the projector 7 are displayed and a non-display region 42 positioned under the display region 41.

The display region 41 may mean a region that the light emitted from the projector 7 reaches. That is, videos or images projected from the projector 7 can be displayed in the display region 41.

The display region 41 can surround at least a portion around the opening 4A formed at the front cover 4. In more detail, the display region 41 can surround a portion of a lower portion around the opening 4A. That is, the upper edge of the display region 41 may be connected with the opening 4A.

Accordingly, images or videos that are displayed on the front cover 4 can be combined with the images or videos that are displayed on the head display 5 and shown to a user. For example, images or videos corresponding to facial expressions of a person may be displayed on the head display 5 and images or videos corresponding to motions of a person may be displayed on the front cover 4.

The light emitted from the projector 7 may not reach the non-display region 42. The non-display region 42 may be positioned under the display region 41.

The projector 7 and the built-in component 8 may overlap the non-display region 42 of the front cover 4 in the front-rear direction.

The sound holes 4B described above may be formed in the non-display region 42.

The area of the display region 41 may be larger than the area of the non-display region 42. That is, a half or more of the area of the front surface of the front cover 4 can function as a display and can be used as various types of user interfaces.

The front cover 4 may further include a sub-non-display region 43. The sub-non-display region 43 may be positioned over the display region 41.

The sub-non-display region 43 may surround the other portion around the opening 4A. That is, a lower portion around the opening 4A may be surrounded by the display region 41 and the upper portion may be surrounded by the sub-non-display region 43.

The internal space of the case 1 may include a first space S1 through which the light emitted from the projector 7 toward the display region 41 passes, a second space S2 positioned between the base 6 and the first space S1, and a third space S3 positioned between the first space S1 and the case 1.

Since the first space S1 is a region through which the light emitted from the projector 7 passes, it is preferable that any component should be not disposed in the first space S1.

The second space S2 may be positioned between the base 6 and the first space S1. The second space S2 may be positioned under the first space S1. The built-in component 8 may be disposed in the second space S2.

The third space S3 may be positioned between the case 1 and the first space S1. The third space S3 may be positioned over and behind the first space S1. The inner bracket 9 and the electronic components 92, 93, and 94 mounted on the inner bracket 9 may be disposed in the third space S3.

Accordingly, the light emitted from the projector 7 can smoothly reach the display region 41 without being blocked by the electronic components 92, 93, and 94.

Referring to FIG. 10, an outer cover 40 having a material different from the front cover 4 may be attached to the front surface of the front cover 4. In more detail, the outer cover 40 may be attached to the front surface of the display region 41.

The front cover 4 and the outer cover 40 may have a material that transmits light at a predetermined ratio. For example, the front cover 4 may include an injection-molded plastic material and the outer cover 40 may include a fabric material. Accordingly, images or videos projected from the projector 7 can be more clearly displayed on the outer cover 40.

Figure 11:
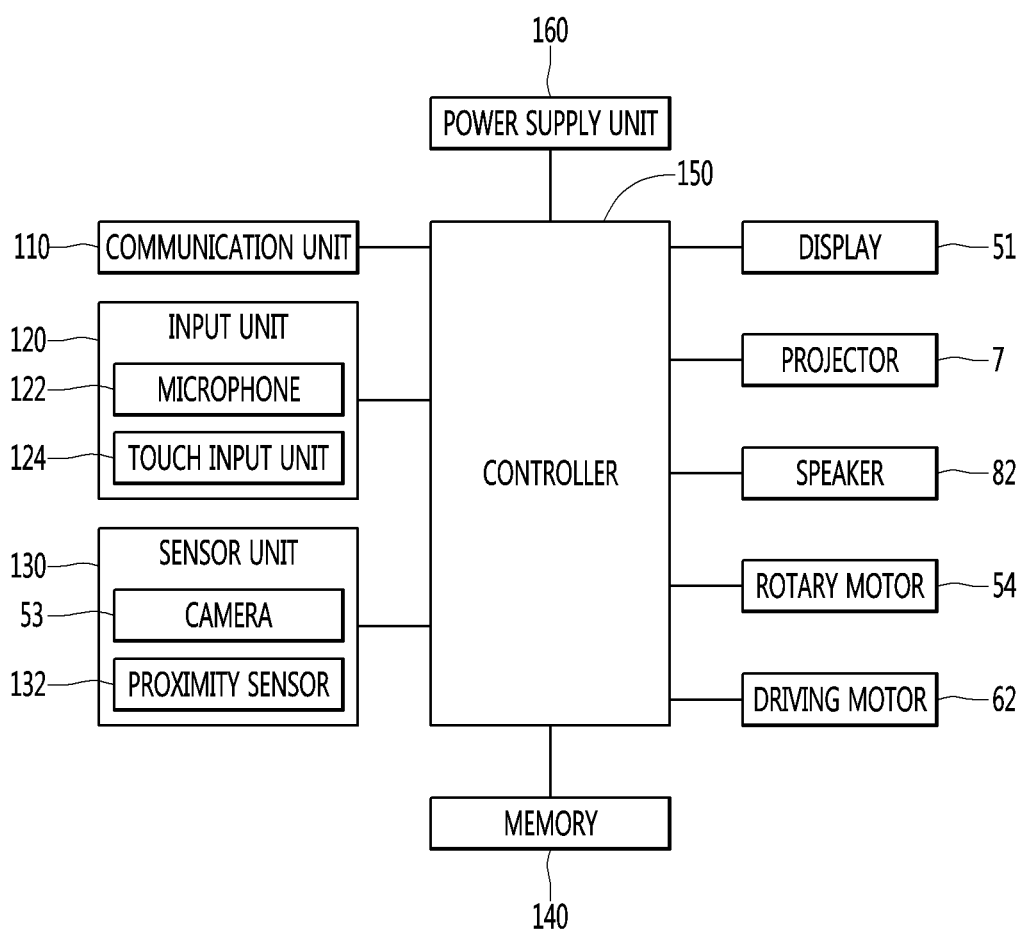
FIG. 11 is a block diagram illustrating a control configuration of the robot according to an embodiment of the present disclosure.

FIG. 11 is a block diagram illustrating a control configuration of the robot according to an embodiment of the present disclosure.

In FIG. 11, the robot is shown to include a communication unit 110, an input unit 120, a sensor unit 130, the display 51, the projector 7, the speaker 82, the rotary motor 54, the driving motor 62, a memory 140, a controller 150, and a power supply unit 160. However, it is understood that all of the components shown in FIG. 11 is illustrated for the convenience of explanation, and is not a requirement in implementing the robot. Hence, the robot may not include a portion of the components shown in FIG. 11. In addition, according to an embodiment, the robot may further include the components illustrated in FIG. 11 and additional control components.

The communication unit 110 may include at least one communication module such that the robot is connected with a server, a terminal, another robot and so forth, via a network. For example, the communication 110 may include short-range communication modules such as Bluetooth and Near Field Communication (NFC), wireless Internet modules such as Wi-Fi and the like, or mobile communication modules. The controller 150 may transmit state information or operation information of the robot, an input received from the user via the input unit 120, and various sensing data acquired by the sensor unit 130, to the server, the terminal and/or another robot via the communication unit 110. In addition, the controller 150 may receive control information of the robot, update data of software in the robot, and so forth, from the server or the terminal via the communication unit 110.

The input unit 120 may include at least one input means for inputting a predetermined signal or data with the robot by a user's manipulation or other actions. For example, the at least one input means may include a microphone 122, a touch input unit 124, a button, a dial, and the like. The user may input a specific request or command with the robot by manipulating the input unit 120.

The microphone 122 may acquire a request or a command in the shape of a voice from the user. Meanwhile, the microphone 122 may function as a sensor unit for sensing voices or audios around the robot.

The touch input 124 may include a touch panel integrally implemented with the display 51, a touch pad positioned outside the robot, and the like. The touch panel and the display 51 may be defined as a touch screen.

The sensor unit 130 may include at least one sensor for acquiring a variety of information around the robot. For example, the sensor unit 130 may include the camera 53, a proximity sensor 132, the microphone 122, and so forth.

The camera 53 may acquire images around the robot. The camera 150 may detect the user or an object based on the images acquired via the camera 53, or recognize a current position of the robot.

The proximity sensor 132 may sense that the user or the object moves closely in a predetermined distance from the robot, or sense that obstacles draw near while the robot drives.

The display 51, the projector 7 and the speaker 82 may output graphics, texts, an audio, and the like, which indicates information related to an operation, a state or the like of the robot. As described above, the display 51 may be positioned in the head display 5. The projector 7 is positioned in the lower case 3 of the robot to project the graphics or the texts to the front cover 4.

Meanwhile, the controller 150 may output the visual content via at least one of the display 51 and the projector 7, based on the information acquired by the sensor unit 130 and the like. Examples related to an output of the visual content will later be described with reference to FIGS. 12 to 18.

The rotary motor 54 may rotate the head display 5 with respect to the case 1. For example, the rotary motor 54 may be configured to rotate the head display 5 vertically with respect to the case 1, but the present disclosure is not limited thereto. As the head display 5 is rotated by the rotary motor 54, the directions which the display 51 and the camera 53 face may be changed.

The driving motor 62 may provide a rotatory force of the driving wheels 63. For example, the driving motors 62 and the driving wheels 63 each may be provided in pairs. A pair of driving motors 62 may be spaced left and right. A pair of driving wheels 63 may also be spaced left and right.

The controller 150 may control a forward movement, a backward movement, rotation, driving speed, and the like, of the robot, by controlling the driving of the pair of driving motors 62. For example, if the controller 150 identically controls the pair of driving motors 62, the robot can move forward or backwards. On the contrary, if the controller 150 differently controls the pair of driving motors 62, the robot can rotate. According to the rotation of the robot, the directions which the front cover 4, the display 51 and the camera 53 face may be changed.

Various data such as control data for controlling operations of the components included in the robot, inputs acquired via the input unit 120, the sensor unit 130 or the like, data for performing an operation corresponding to information, and so forth, may be stored in the memory 140.

In addition, a plurality of visual contents outputted by corresponding to a situation sensed by the controller 150 may be stored in the memory 140. The plurality of visual contents may be previously stored in the memory 140 when the robot was released. According to an embodiment, the plurality of visual contents may be received and stored from the server, the terminal or the like, via the communication unit 110.

The controller 150 may include at least one controller (a processor) for controlling a general operation of the robot. The at least one controller may include CPU, AP (application processor), a micro-computer, an integrated circuit, ASIC (application specific integrated circuit), FPGA (field programmable gate array) and the like.

In particular, the controller 150 may sense a situation corresponding to information or data acquired from the communication unit 110, the input unit 120, the sensor unit 130 and the like. The controller 150 may acquire the visual content based on the sensed situation, and output the acquired visual content via at least one of the display 51 or the projector 7. Detailed contents related thereto will be described through FIGS. 12 to 15.

In addition, the controller 150 may acquire height information of the user from the image acquired via the camera 53, adjust a display position of the visual content outputted via the projector 7 based on the acquired height information, or adjust a rotation angle of the head display 5. Detailed contents related thereto will be described through FIGS. 16 to 18.

The power supply unit 160 may supply power for operations of each of the components included in the robot. For example, the power supply unit 160 may include the battery 81 illustrated in FIG. 4 and the like.

Figure 12:
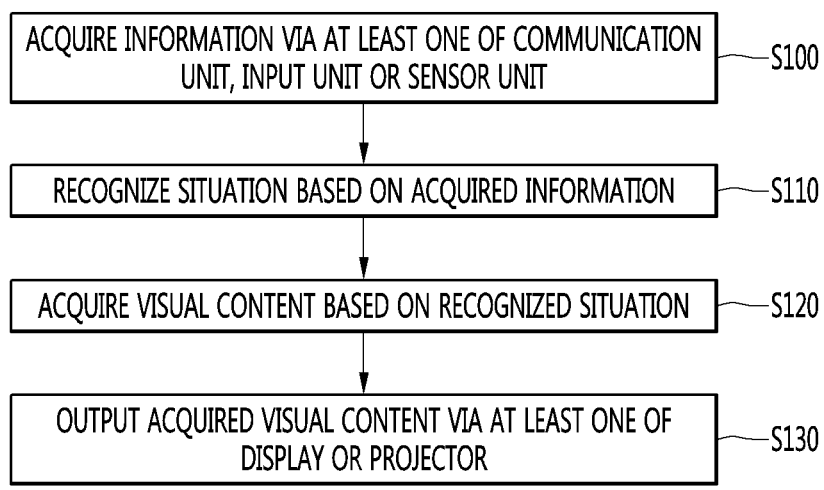
FIG. 12 is a flowchart for explaining an output operation of a visual content according to an embodiment of the present disclosure.

FIG. 12 is a flowchart for explaining an output operation of a visual content according to an embodiment of the present disclosure.

Referring to FIG. 12, the robot may acquire information via at least one of the communication unit 110, the input unit 120 or the sensor unit 130 (S100), and may recognize the situation corresponding to the acquired information (S1100.)

The controller 150 may recognize the situation based on the information acquired via at least one of the communication unit 110, the input unit 120 or the sensor unit 130. The situation may mean various kinds of situations related to the user or the robot, such as the command or request inputted from the user, and the environmental change around the robot, and the like.

As an example, the controller 150 may recognize the request or the command of the user included in the voice, by acquiring the voice of the user via the microphone 122 and recognizing the acquired voice via a voice recognition module (not shown).

As another example, the controller 150 may recognize a situation that the user is eating, by acquiring the image of the user who is eating, via the camera 53, and recognizing the acquired image via an image recognition module (not shown).

As another example, the controller 150 may acquire weather information from the server via the communication unit 110, and may recognize a situation that the concentration of fine particles is high in a space in which the robot is positioned or an area in which the robot is positioned, based on the acquired weather information.

The robot may acquire the visual content based on the recognized situation (S120).

The controller 150 may acquire the visual content corresponding to the recognized situation. For example, the controller 150 may load the visual content corresponding to the recognized situation, among the plurality of visual contents stored in the memory 140. In addition, the controller 150 may receive the visual content corresponding to the recognized situation from the server and the like, via the communication unit 110.

The robot can output the visual content via at least one of the display 51 or the projector 7 (S130).

For example, the visual content may include at least one of a portion content outputted via the display 51 or a portion content projected to the front cover 4 via the projector 7.

The controller 150 may control at least one of the display 51 or the projector 7 so as to output the acquired visual content.

The controller 150 enables an output of the content associated between the display 51 and the projector 7, by outputting the visual content via the display 51 and the projector 7.

In addition, the controller 150 can more effectively output the content corresponding to the recognized situation, by outputting a facial expression corresponding to the situation via the display 51, and outputting a motion, an object or the like, corresponding to the situation via the projector 7.

Detailed examples related thereto will be described through FIGS. 13 to 15.

Figure 13:
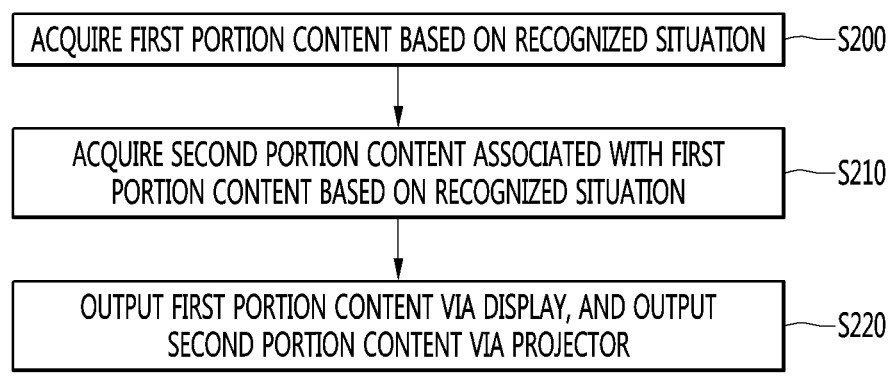
FIG. 13 is a flowchart indicating one example related to the output operation of the visual content of FIG. 12.

FIG. 13 is a flowchart indicating one example related to the output operation of the visual content of FIG. 12. FIG. 13 illustrates a detailed example of steps S120 and S130 among the steps illustrated in FIG. 12.

Referring to FIG. 13, the robot may acquire a first portion content based on the recognized situation (S200). In addition, the robot may acquire a second portion content associated with the first portion content, based on the recognized situation (S210).

The first portion content indicates a content outputted via the display 51 among the visual content described in FIG. 12. The second portion content indicates a content outputted via the projector 7 among the visual content described in FIG. 12.

The first portion content and the second portion content may be stored in the memory 140, the server or the like, in the shape of being integrated to one visual content. In this case, the controller 150 may acquire the first portion content and the second portion content together, by acquiring the visual content corresponding to the recognized situation from the memory 140, the server or the like.

According to an embodiment, the first portion content and the second portion content are separate contents, and may be stored in the memory 140, the server or the like. In this case, the controller 150 may acquire the first portion content and the second portion content corresponding to the recognized situation from the memory 140, the server or the like, respectively.

The robot can output the first portion content via the display 51, and output the second portion content via the projector 7 (S220).

In the case of the robot according to an embodiment of the present disclosure, the display 51 may output facial expressions, glances or the like, corresponding to the recognized situation, and the projector 7 may output a motion, a gesture, an object or the like, corresponding to the recognized situation via the front cover 4. That is, the user may recognize the head display 5 including the display 51 as a face of the robot, and the front cover 4 as a body of the robot.

Accordingly, the robot may output the visual contents associated with each other by using the display 51 and the projector 7, and may more effectively output the visual content corresponding to the recognized situation.

In addition, the front cover 4 to which the content outputted from the projector 7 is projected, performs only a role of indicating an appearance of the robot when the content is not outputted. That is, the robot according to an embodiment can prevent the problem of degrading the beauty of the robot as an area which the display occupies in the robot is increased, by including the projector 7 and the front cover 4 to which the image of the projector 7 is projected.

Figure 14:
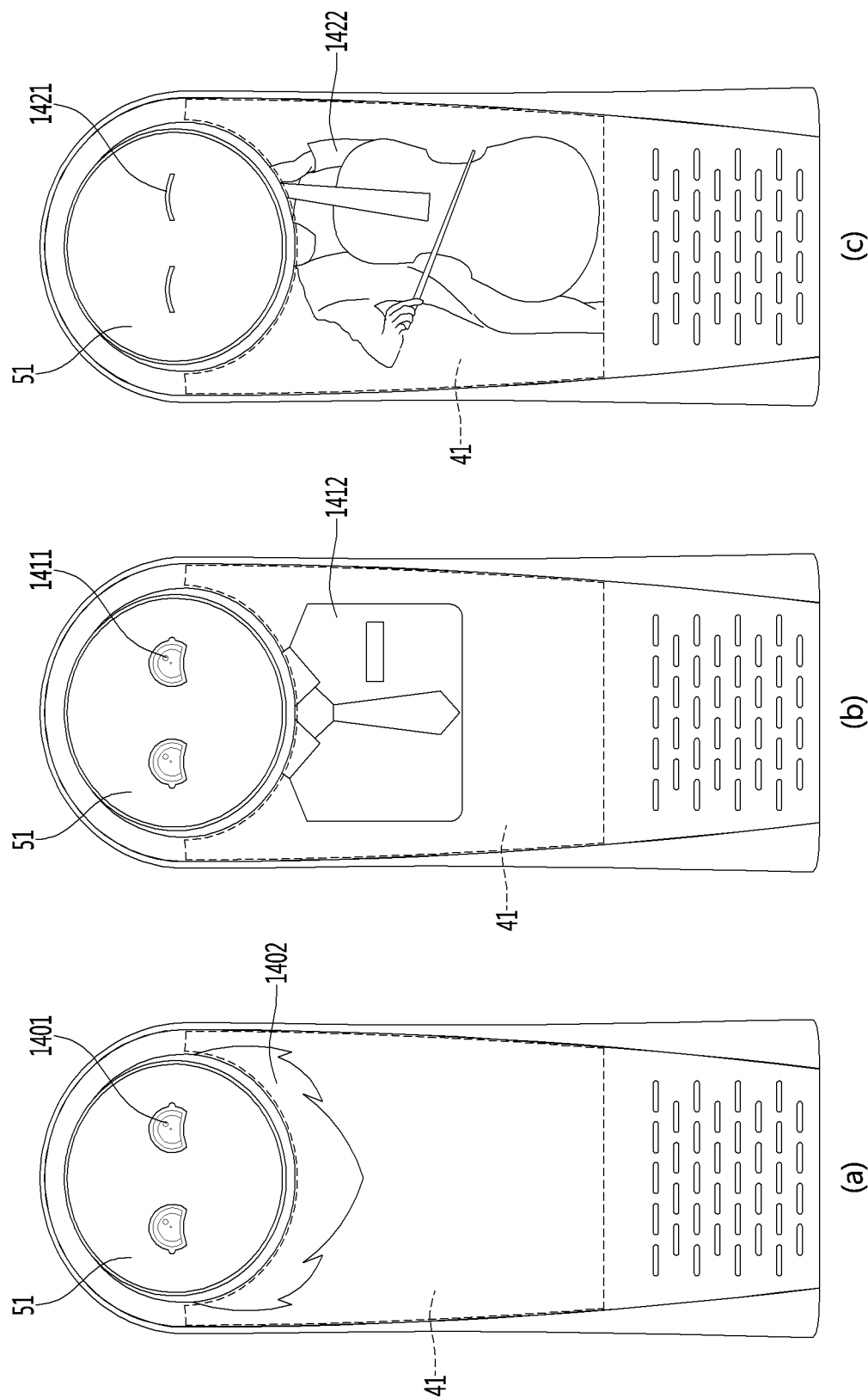
FIGS. 14 and 15 are example views related to the output operation of the visual content of FIGS. 12 and 13.
Figure 15:
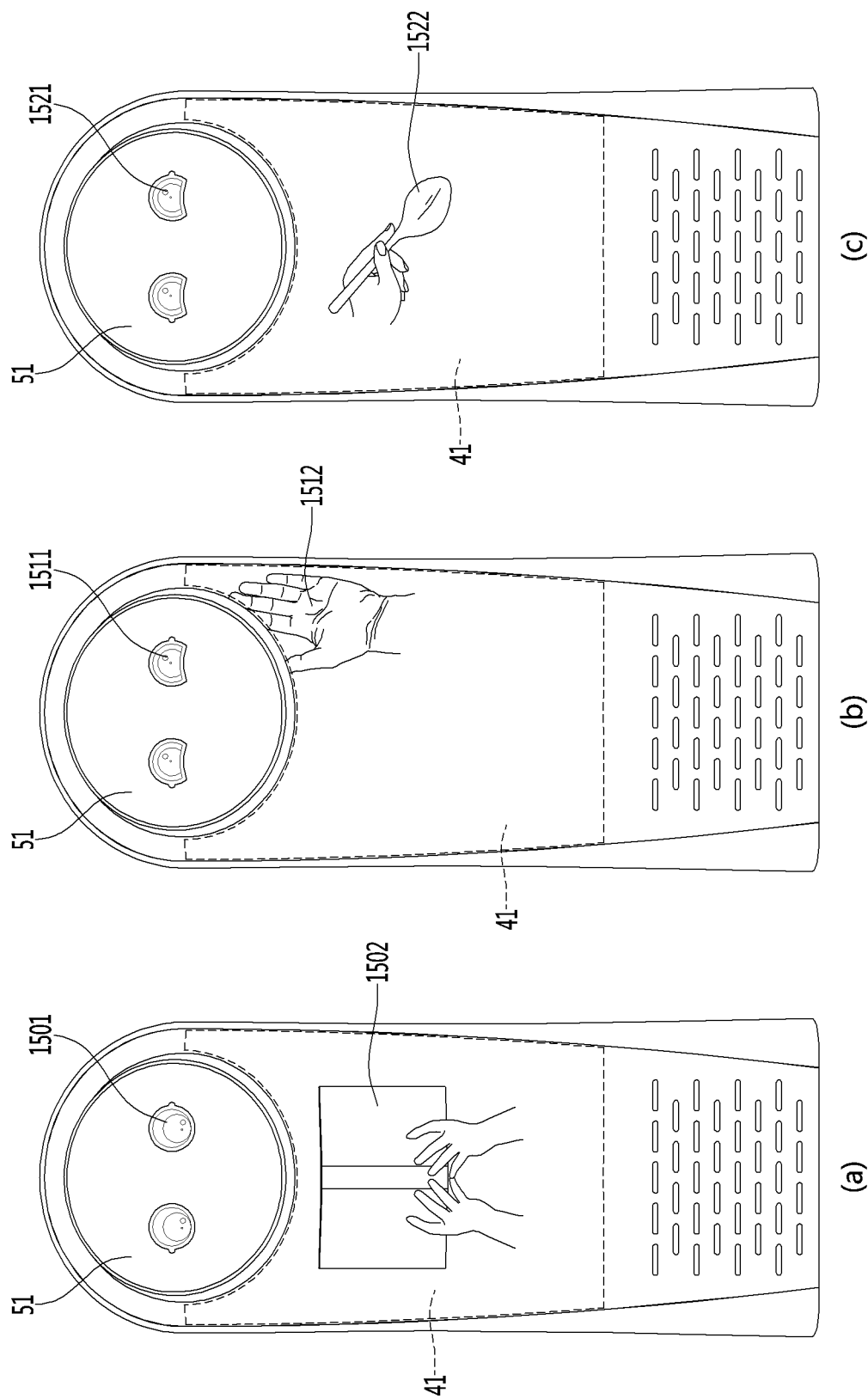

FIGS. 14 and 15 are example views related to the output operation of the visual content of FIGS. 12 and 13.

Referring to FIG. 14, the robot may provide the visual contents associated with each other via the display 51 and the projector 7, based on the recognized situation.

Referring to (a) of FIG. 14, for example, the controller 150 may acquire voices including a keyword related to "a beard" from the user via the microphone 122. In this case, the controller 150 may acquire the keyword from the voices via a voice recognition, and acquire the visual content related to "the beard" from the memory 140, the server or the like, based on the acquired keyword.

For example, the visual content may include a first portion content 1401 indicating an expression of eyes (a glance) in a general situation, and a second portion content 1402 corresponding to "the beard". In addition, the visual content may include only the second portion content 1402.

The controller 150 may output the first portion content 1401 via the display 51, and project the second portion content 1402 to the display region 41 of the front cover 4 via the projector 7. At this time, the second portion content 1402 may be displayed on an area including at least a portion of a circumference of an opening of the front cover 4, or an area adjacent to at least a portion of the circumference of the opening. That is, the second portion content 1402 is displayed in the shape of being connected to a lower portion of the head display 5, and accordingly, the first portion content 1401 and the second portion content 1402 are associated with each other to provide one visual content. In this case, the user may feel like an aesthetic impression that the beard seems to grow under the user's robot face.

Referring to (b) of FIG. 14, for example, the controller 150 may receive schedule information of the user from the terminal via the communication unit 110. The controller 150 may recognize that a user's interview is scheduled based on the received schedule information. The controller 150 may acquire a visual content related to "an interview" from the memory 140, the server or the like, based on the recognized result.

For example, the visual content may include a first portion content 1411 indicating a general expression of eyes (a glance) and a second portion content 1412 corresponding to "a suit". In addition, the visual content may include only the second portion content 1412.

The controller 150 may output the first portion content 1411 via the display 51, and may project the second portion content 1412 to the display region 41 of the front cover 4 via the projector 7. At this time, the second content 1412 may be displayed on the area including at least a portion of a circumference of an opening of the front cover 4, or the area adjacent to at least a portion of the circumference of the opening. That is, the second portion content 1412 is displayed in the shape of being connected to the lower portion of the head display 5, and accordingly, the first portion content 1411 and the second portion content 1412 are associated with each other to provide one visual content. Accordingly, the robot may remind you that the interview is scheduled, by providing the user with an aesthetic impression that the robot seems to wear the suit.

Referring to (c) of FIG. 14, for example, the controller 150 may acquire an audio corresponding to "classical music" via the microphone 122. In this case, the controller 150 may recognize that the "classical music" is included in the audio via the audio recognition, and acquire the visual content related to "the classical music" via the memory 140, the server or the like, based on the recognized result.

For example, the visual content may include a first portion content 1421 indicating a general expression of eyes (a glance) related to playing instruments and a second portion content 1422 corresponding to "playing instruments".

The controller 150 may output the first portion content 1421 via the display 51, and may project the second portion content 1422 to the display region 41 of the front cover 4 via the projector 7. At this time, the second content 1422 may be displayed on the area including at least a portion of a circumference of an opening of the front cover 4, or the area adjacent to at least a portion of the circumference of the opening. That is, the second portion content 1422 is displayed in the shape of being connected to the lower portion of the head display 5, and accordingly, the first portion content 1421 and the second portion content 1422 are associated with each other to provide one visual content. In this case, the user may feel like an aesthetic impression that the robot seems to play the instruments.

That is, according to an embodiment illustrated in FIG. 14, the robot may provide us with various aesthetic impressions by providing the one visual content in which portion contents each outputted by each of the display 51 and the projector 7 are associated with each other.

Referring to FIG. 15, the robot may provide the visual contents in various ways via the display 51 and the projector 7.

Referring to (a) of FIG. 15, for example, the controller 150 may receive an execution request of a function "reading books aloud" from the user via the input unit 120 (for example, a touch input unit 124). In response to the request, the controller 150 may output a content corresponding to specific books (for example, a fairy tale story, a novel and the like) in a voice file form via the speaker 82.

Meanwhile, the controller 150 may acquire the visual content related to the function "reading books aloud" from the memory 140, the server or the like.

For example, the visual content may include a second portion content 1502 including books and a first portion content 1501 indicating an appearance of eyes (a glance) that sees the book. The controller 150 may output the first portion content 1501 via the display 51, and may project the second portion content 1502 to the display region 41 of the front cover 4 via the projector 7. In this case, the user may feel like an aesthetic impression that the robot seems to simultaneously see and read the book aloud.

Referring to (b) of FIG. 15, for example, the controller 150 may receive the user's voice via the microphone 122, and recognize the received voice. Sometimes, if a voice volume of the user is low, the voice has noises, and the like, the controller 150 may fail to recognize the received voice.

In this case, the controller 150 may acquire the visual content related to a voice recognition failure situation from the memory 140, the server or the like.

For example, the visual content may include a first portion content 1511 indicating a general expression of eyes (a glance) and a second portion content 1512 corresponding to a "palm". In addition, the visual content may include only the second portion content 1512.

The controller 150 may output the first portion content 1511 via the display 51, and project the second portion content 1512 to the display region 41 via the projector 7. In particular, the controller 150 may control a projecting position such that the "palm" corresponding to the second portion content 1512 is projected to an area adjacent to a side surface of the head display 5. Based on the outputted visual contents 1511, 1512, the user may recognize that the robot did not receive the voice more smoothly.

Referring to (c) of FIG. 15, for example, the controller 150 may recognize meal time from current time information. In this case, the controller 150 may acquire the visual content related to meals from the memory 140, the server or the like.

For example, the visual content may include a first portion content 1521 indication a general expression of eyes (a glance) and a second portion content 1522 corresponding to a "spoon". In addition, the visual content may include only the second portion content 1522.

The controller 150 may output the first portion content 1521 via the display 51, and project the second portion content 1522 to the display region 41 via the projector 7. Based on the outputted visual contents 1521, 1522, the user may recognize that it is almost time to eat.

That is, according to an embodiment illustrated in FIG. 15, the robot may display the visual content related to a specific situation more effectively by using the display 51 and the projector 7.

Figure 16:
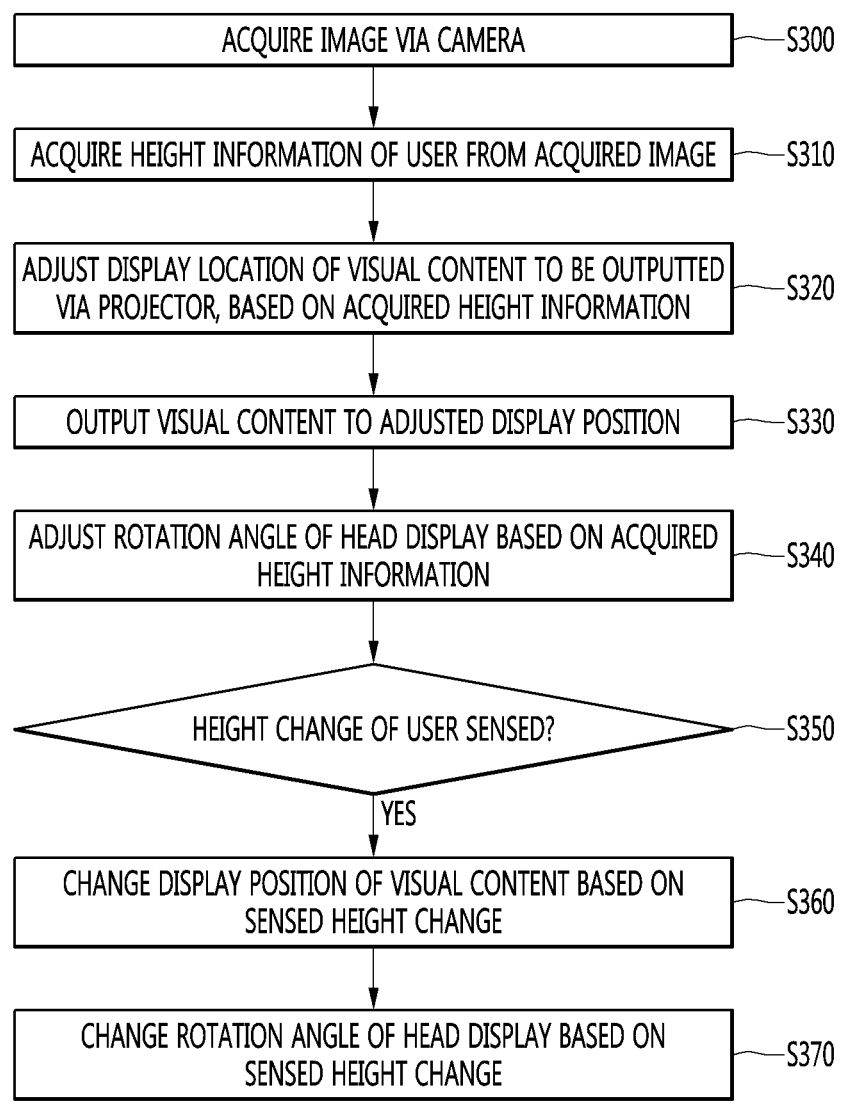
FIG. 16 is a flowchart for explaining an output operation of the visual content of the robot according to an embodiment of the present disclosure.

FIG. 16 is a flowchart for explaining an output operation of the visual content of the robot according to an embodiment of the present disclosure.

Referring to FIG. 16, the robot can acquire an image via the camera 53 (S300), and acquire height information of the user from the acquired image (S310).

For example, the height information may mean height from a bottom to the user's face. That is, the controller 150 may recognize the user's face from the acquired image via the camera 53, and acquire the height information of the user based on a position of the recognized face.

According to an embodiment, the height information may mean heights of hands according to a user's posture, height of the user's eyes, and the like.

The robot can adjust a display position of the visual content to be outputted via the projector 7, based on the acquired height information (S320).

The controller 150 may set a position to which the visual content will be projected in the display region 41 of the front cover 4, based on the acquired height information. As the height corresponding to the acquired height information gets lower, the position to which the visual content will be projected also gets lower. On the contrary, as the height corresponding to the acquired height information gets higher, the position to which the visual content will be projected also gets higher.

The robot can output the visual content to an adjusted display position (S330).

The controller 150 may control the projector 7 such that the visual content is outputted on the adjusted display position based on the height information of the user. In detail, the controller 150 may create output data so as to output the visual content to the adjusted display position among the display region 41, and provide the created output data to the projector 7.

Although not shown in the figures, the controller 150 may adjust the display position of the visual content based on a direction in which the user is positioned on the basis of the robot. For example, if the user is sensed to be positioned on the left on the basis of the front of the robot, the controller 150 may display the visual content on a position corresponding to a left side of the display region 41.

In addition, the robot can adjust a rotation angle of the head display 5 based on the acquired height information (S340).

The controller 150 may set the rotation angle of the head display 5 based on the acquired height information. The controller 150 may control the rotary motor 54 based on the set rotation angle. For example, if the height information of the user is lower than a height of a head display 5, the controller 150 may control the rotary motor 54 such that the head display 5 is rotated downwards by a predetermined angle.

Meanwhile, the controller 150 may acquire an image which periodically or constantly includes the user via the camera 53 among an output of the visual content, and may acquire the height information of the user from the acquired image.

The controller 150 can sense a height change of the user based on the acquired height information (S350).

For example, the controller 150 may sense that the height of the user is changed, based on a body position (for example, a face position and the like) of the user which is changed in accordance with the cases that the user is standing while falling on his/her face or having a seat (or otherwise), and so forth.

If the height change of the user is sensed (YES in S350), the robot can change the display position of the visual content outputted via the projector 7 based on the sensed height change (S360), and can change the rotation angle of the head display 5 (S370).

The controller 150 may create output data in which the display position of the visual content is changed, based on the sensed height change, and provide the created output data to the projector 7. The projector 7 may project the visual content to the display region 41 based on the output data.

In addition, the controller 150 may reset the rotation angle of the head display 5 based on the sensed height change, and control the rotary motor 54 based on the reset rotation angle.

Although not shown in the figures, the controller 150 may sense that a direction that the user is positioned is changed on the basis of the robot, based on the image acquired from the camera 53. In this case, the controller 150 may change the display position of the visual content more to the left or the right than before, based on the sensed result.

According to an embodiment, the controller 150 may change a direction to the robot by controlling the driving motor 62, if the user is sensed to disappear via a left edge or a right edge of an image acquired from the camera 53. Hence, the user can easily confirm the visual content outputted by the robot during his/her movement.

Figure 17:
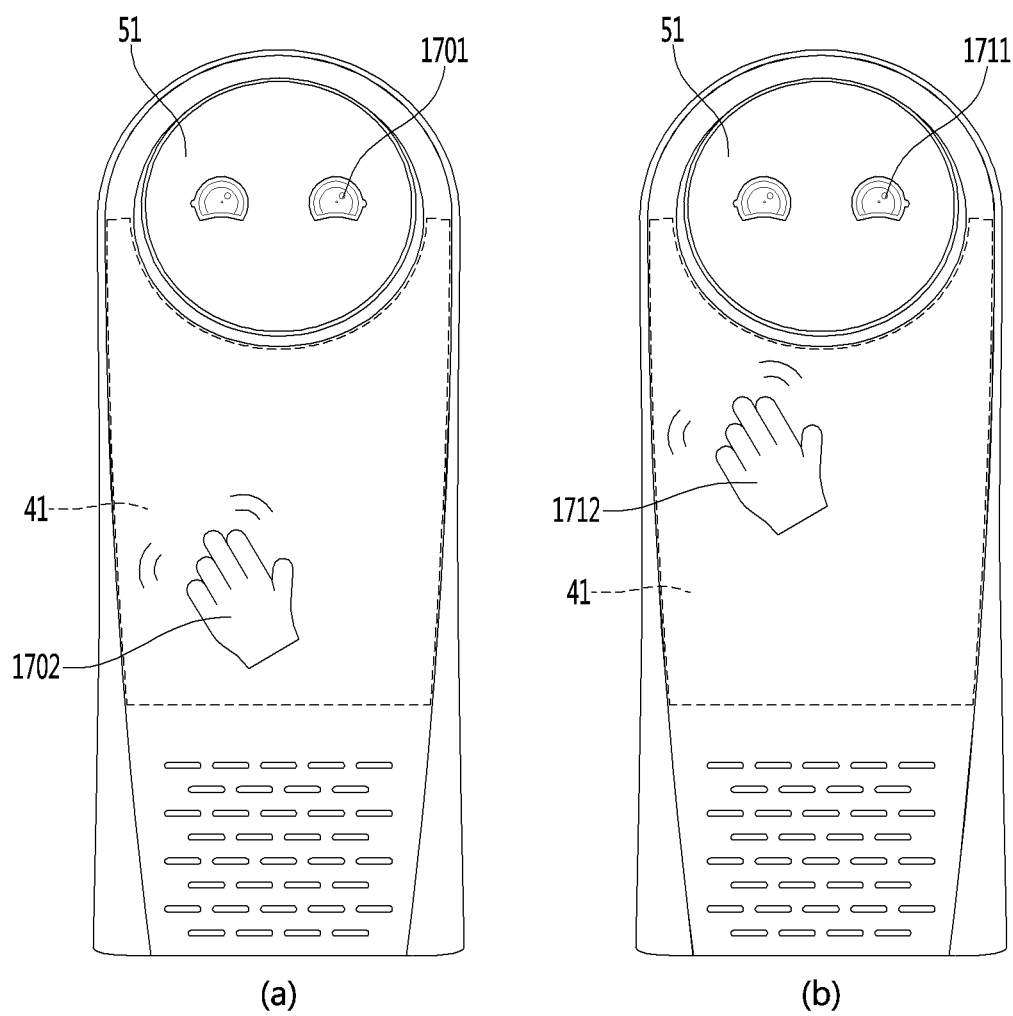
FIGS. 17 and 18 are example views related to the output operation of the visual content of FIG. 16.
Figure 18:
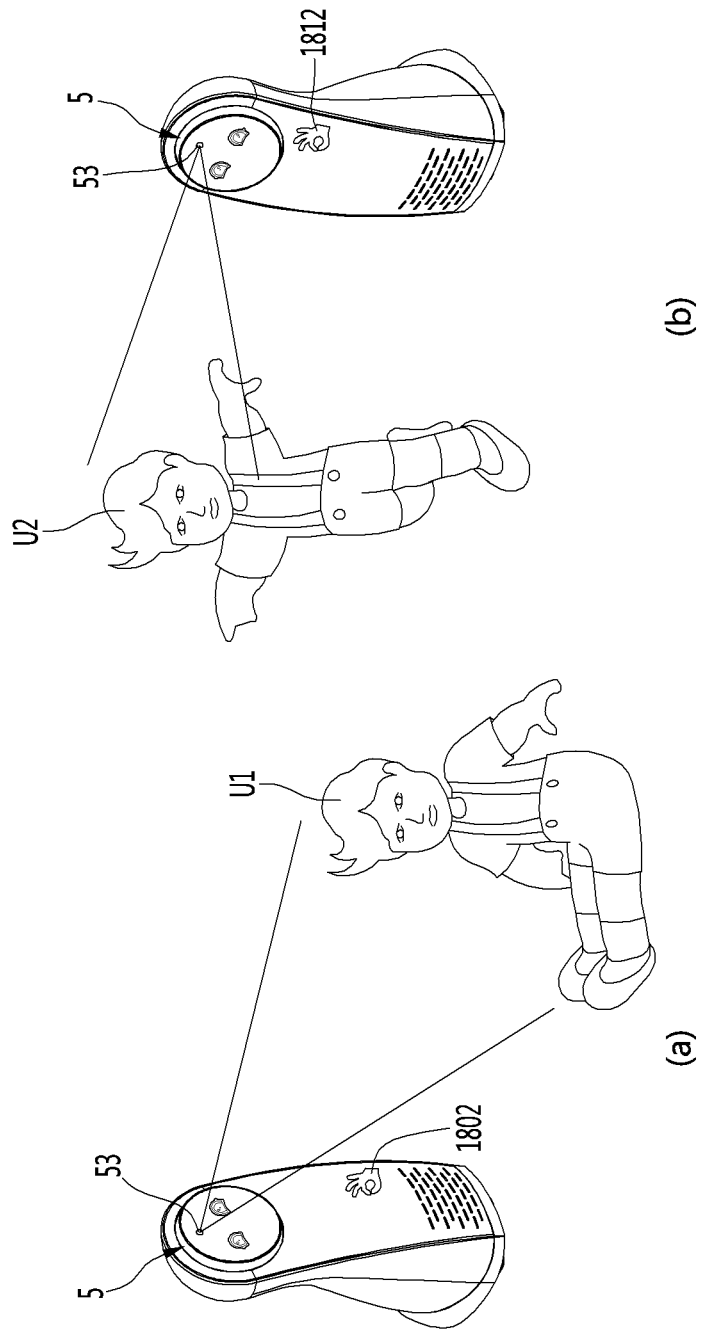

FIGS. 17 and 18 are example views related to the output operation of the visual content of FIG. 16.

Referring to (a) and (b) of FIG. 17, for example, if the visual content is a content for inducing a user's high five, the visual content may include first portion contents 1701, 1711 indicating a specific expression, and second portion contents 1702, 1712 corresponding to the palm.

The controller 150 of the robot may acquire height information of the user from the image acquired via the camera 53, and adjust the display positions of the visual contents (for example, the second portion contents 1702, 1712) based on the acquired height information.

In (a) of FIG. 17, if the acquired height information corresponds to a first height, the controller 150 may set the display position of the second portion content 1702 to a first portion in the display region 41 based on the first height.

Meanwhile, in (b) of FIG. 17, if the acquired height information corresponds to a second height higher than the first height, the controller 150 may set the display position of the second portion content 1712 to a second position higher than the first position.

The user may give a high five with the robot in a manner that the user's hand is in contact with an area where the second portion contents 1702, 1712 are displayed. At this time, the area where the second portion contents 1702, 1712 are displayed is based on the height information of the user, and the user may enable his/her hand to more easily contact the area where the second portion contents 1702, 1712 are displayed.

Referring to (a) and (b) of FIG. 18, the robot may adjust the display positions of visual contents 1802, 1812 by sensing the height change of the user.

In (a) of FIG. 18, the controller 150 may acquire the height information of the user by sensing a face height of a user U1 based on the image acquired via the camera 53. In addition, the controller 150 may acquire the height information of the user by sensing that the user U1 is in a sitting posture based on the image.

The controller 150 may display the visual content 1802 on the first position of the display region 41 based on the acquired height information. In addition, the controller 150 may set the rotation angle of the head display 5 based on the acquired height information, and control the rotary motor 54 based on the set rotation angle.

Referring to (b) of FIG. 18, the controller 150 may sense a height change of a user U2 based on the image acquired via the camera 53. The controller 150 may sense the height change by sensing a change of a face height of the user U2. In addition, the controller 150 may sense the height change by sensing that the user U2 is in a standing posture based on the image.

The controller 150 may move the display position of the visual content 1812 to the second position higher than the first position based on the height change. In addition, the controller 150 may reset the rotation angle of the head display 5 based on the height change, and control the rotary motor 54 based on the reset rotation angle.

That is, according to embodiments illustrated in FIGS. 16 to 18, the robot may display an optimum height of the visual content via the projector 7 and the front cover 4, based on the height information related to the face height of the user, and the like. Accordingly, the robot may provide the user with the visual content more effectively.

According to an embodiment of the present disclosure, the robot may provide visual contents naturally associated using the display and the projector.

In addition, the robot may solve degradation of the beauty of the robot according to an excessive increase of an area which the display occupies, by including the projector for projecting an image or a video to the front cover.

Furthermore, the visual content may be displayed on an optimal position via the projector and the front cover, based on the height information sensed according to a position of a user's face, and the like. Accordingly, the visibility of the user for the visual content may be improved.

The above-mentioned explanation is only an exemplary description of the technical spirit of the present disclosure, and thus, it will be apparent to those skilled in the art that various modifications and variations can be made in the scope not departing from the intrinsic characteristics of the disclosure.

Therefore, the embodiments described in the present disclosure are not for limiting the technical spirit of the present disclosure but for explaining the same, and the scope of the technical spirit of the present disclosure is not limited by such embodiments.

It should be understood that the protection scope of the present disclosure is interpreted by the following claims, and all technical spirits in their equivalent scope are included in the right scope of the present disclosure.

What is claimed is:

1. A robot, comprising:
a case configured to form an external shape;
a front cover configured to cover an internal space of the case on a front of the case;
a projector arranged in the internal space and configured to project an image or a video to a display region of the front cover;
a head display arranged in an opening formed at the front cover, and including a display; and
a controller configured to output a visual content via at least one of the projector or the display,
wherein the display region surrounds at least a portion around the opening,
wherein the visual content comprises:
a first portion content outputted via the display; and
a second portion content outputted via the projector, and associated with the first portion content,
wherein the second portion content is displayed on at least a portion of the region corresponding to a circumference of the opening among the display region.

2. The robot of claim 1, further comprising at least one of:
a communication unit connected to at least one of a server and a terminal;
a microphone configured to acquire information in the shape of a voice or an audio; or
a camera configured to acquire information in the shape of an image,
wherein the controller is configured to acquire the visual content based on information acquired via the communication unit, the microphone, or the camera.

3. The robot of claim 2, further comprising a memory for storing a plurality of visual contents,
wherein the controller is configured to load the visual content corresponding to the acquired information among the plurality of visual contents from the memory.

4. The robot of claim 2,
wherein the controller is configured to acquire the visual content corresponding to the acquired information from a server connected via the communication unit.

5. The robot of claim 2,
wherein the controller is configured to:
recognize a situation based on the acquired information; and
acquire the visual content corresponding to the recognized situation, wherein the visual content includes the first portion content outputted via the display, and the second portion content outputted via the projector, wherein the first portion content indicates facial expressions or glances related to the situation, and the second portion content includes at least one of a motion, a gesture and an object related to the situation.

6. The robot of claim 1, further comprising a camera for acquiring an image, wherein the controller is configured to:

acquire height information of the user, if the image acquired via the camera includes the user, and set a display position of the visual content outputted via the projector, based on the acquired height information.

7. The robot of claim 6, wherein the controller is configured to:

set the display position of the visual content to a first position in the display region of the visual content, if the acquired height information corresponds to a first height, and set the display position of the visual content to a second position higher than the first position, if the acquired height information corresponds to a second height higher than the first height.

8. The robot of claim 6, wherein the controller is configured to:

recognize a face of the user included in the acquired image, and acquire the height information based on a position of the recognized face.

9. The robot of claim 6, wherein the controller is configured to:

sense a height change of the user from an image acquired by using the camera among an output of the visual content; and change a display position of the visual content outputted via the projector based on the sensed height change.

10. The robot of claim 9, further comprising a rotary motor for rotating the head display vertically, wherein the controller is configured to:

set a rotation angle of the head display based on the acquired height information; and control the rotary motor based on the set rotation angle.

11. The robot of claim 10, wherein the controller is configured to:

reset the rotation angle of the head display based on the sensed height change, and control the rotary motor based on the reset rotation angle.

\* \* \* \* \*